United States Patent [19]

Cruickshank

[11] Patent Number: 5,161,411
[45] Date of Patent: Nov. 10, 1992

[54] MATERIAL LEVEL INDICATION

[75] Inventor: William T. Cruickshank, Port Huron, Mich.

[73] Assignee: Bindicator Company, Port Huron, Mich.

[21] Appl. No.: 769,828

[22] Filed: Oct. 2, 1991

[51] Int. Cl.$^5$ .................... G01F 23/00; G01N 21/49
[52] U.S. Cl. ...................... 73/293; 307/118; 340/619; 250/577
[58] Field of Search .......... 73/290 R, 291, 304 R, 73/293; 307/440, 442, 118; 340/618, 619; 250/577

[56] References Cited

U.S. PATENT DOCUMENTS

| | | | |
|---|---|---|---|
| 3,468,604 | 9/1969 | Matkovich et al. | 73/293 |
| 4,244,385 | 1/1981 | Hotine | 307/118 |
| 4,392,032 | 7/1983 | Roach, II | 340/617 |
| 4,410,886 | 10/1983 | Motsinger | 73/293 |
| 4,499,766 | 2/1985 | Fathaver et al. | 307/118 |
| 4,600,844 | 7/1986 | Atkins | 307/118 |
| 4,713,552 | 12/1987 | Denis et al. | 73/293 |
| 4,961,069 | 10/1990 | Tsaprazis | 340/619 |
| 5,088,324 | 2/1992 | Nemath | 73/293 |

FOREIGN PATENT DOCUMENTS

| | | | |
|---|---|---|---|
| 58-419 | 4/1983 | Japan | 73/293 |
| 3135 | 9/1983 | PCT Int'l Appl. | 73/293 |

*Primary Examiner*—William A. Cuchlinski, Jr.
*Assistant Examiner*—G. Bradley Bennett
*Attorney, Agent, or Firm*—Barnes, Kisselle, Raisch, Choate, Whittemore & Hulbert

[57] ABSTRACT

A system for indicating level of material that includes first and second probes disposed for operative coupling with material whose level is to be sensed. First and second electrical input circuits are respectively coupled to the probes and provide first and second signals. First and second electrical output circuits provide respective indications of material level by operating relay switches. A latch circuit has inputs that receive the respective first and second signals, and an output that changes state only when both first and second signals change state. The output circuits are selectively connected by jumpers either to the associated input circuit or to the latch output.

9 Claims, 2 Drawing Sheets

MATERIAL LEVEL INDICATION

The present invention is directed to systems for indicating level of material such as in a storage vessel or the like, and more particularly to a system for selectively indicating levels of materials with respect to first and second material probes as independent or interrelated functions of each other.

BACKGROUND AND OBJECTS OF THE INVENTION

A number of devices have heretofore been proposed and made commercially available for indicating point-level of material in a storage container or vessel. For example, U.S. Pat. No. 3,834,235 discloses a device in which an optical probe is positioned at the desired height of material level detection in the vessel. Light energy is directed into the probe from externally of the vessel. When material is spaced from the probe within the vessel, the difference in indices of refraction between the probe and air at the probe tip is such that the light energy is reflected internally of the probe for detection. On the other hand, when material covers the probe tip, the refractive index differential at the probe tip is so altered that the light energy escapes into the material. Hence, the fact that material has reached the level of the probe tip may be detected externally of the vessel by the absence of light energy internally reflected from the probe tip.

U.S. Pat. No. 3,625,058 discloses a device of this character in which a tuning fork is positioned at a predetermined height within the vessel at which material level indication is desired, and is coupled to a motor for vibrating the fork. When material is spaced from the fork, the fork is free to vibrate. However, when the material reaches the level of the fork and covers the fork, vibration is damped. Thus, the fact that the level of material in the vessel has reached the height of the fork may be detected as a function of vibration characteristics of the fork itself. U.S. Pat. No. 4,392,032 discloses a device of the subject character in which the probe takes the form of a paddle positioned within the vessel at the desired height of material level detection, and is connected to a motor carried within a suitable housing externally of the vessel. When the material is spaced from the paddle, the paddle is free to rotate as driven by the motor. However, when the material reaches the level of the paddle, paddle rotation is retarded, and such retardation may be detected externally of the vessel.

U.S. Pat. No. 4,499,766 discloses a material level indicating device in which a capacitance probe is positioned within a vessel such that electrical characteristics at the probe vary as a function of dielectric properties of the material, which in turn vary as a function of material level. The probe is connected in an LC resonant circuit to an rf oscillator, and phase shift of the probe signal is monitored to indicate changes in material level.

It is often desirable in systems of this character to provide indications of two or more material levels, in one or a number of vessels, as interrelated functions of each other. For example, it may be desirable to provide a system in which two probes are coupled to a vessel so as to be responsive to high and low levels of material within the vessel respectively. A system of this character may be employed for controlled filling of the vessel until the material covers both probes, and thereafter for controlled emptying of the vessel until both probes are uncovered. A general object of the present invention is to provide a system of such a character that is economical to manufacture, and that may be readily adjusted in the field by relatively unskilled personnel for providing indications of material level at the respective probes either independently of each other, as conjoint functions of each other or a combination thereof. Yet another object of the present invention is to provide a system of the described character that may be readily adjusted in the field for unusual conditions at the probe and/or for specific operating characteristics of the material in connection with which the system is to be used.

SUMMARY OF THE INVENTION

A system for indicating level of material in accordance with the present invention includes first and second probes disposed for operative coupling with material whose level is to be sensed. In the presently preferred embodiment of the present invention herein disclosed, the probes comprise optical probes of the type disclosed in above-noted U.S. Pat. No. 3,834,235, although the principles of the invention in their broader aspects are by no means limited thereto. First and second electrical input circuits are respectively coupled to the probes, and provide first and second signals at a first voltage level or state when material is adjacent to the associated probe, and at a second voltage level or state when material is spaced from the probe. First and second electrical output circuits provide respective indications of material level by operating relay switches or the like. The first and second input circuits are connected to the first and second output circuits for selectively operating in a first mode of operation in which the first and second output circuits are respectively responsive to the associated first and second input circuits independently of each other, and a second mode of operation in which one of the first and second output circuits is directly responsive to the associated input circuit while the other of the first and second output circuits is responsive to both of the input circuits conjointly. Preferably, the second output circuit is connected to the first and second input circuits to function in the second mode of operation so as to provide a change in output state from the second output circuit only when both of the first and second signals change state.

In the preferred embodiment of the invention, the input circuits are coupled to the output circuits by a latch circuit that has first and second inputs respectively coupled to the outputs of the first and second input circuits. The latch output assumes a first state when the signals from the respective input circuits have a first relationship (e.g., both high), and switches to a second state when the signals have the opposite relationship (e.g., both low). That is, both probe signals must change state for the latch output to change state. Each of the first and second output circuits is selectively and alternatively connectable to the latch output or the output of the associated input circuit. Preferably, such selective alternative connection is accomplished by means of jumpers at the respective output circuits, although switches or the like may also be employed.

In the preferred embodiment of the invention in which the material probes comprise respective optical probes, the output of each probe is compared at the associated input circuit with a threshold that is selectively variable by an operator for accommodating unusual or abnormal conditions at the probe, and for selectively setting the associated input circuitry for the optical characteristics of the material in connection with which the probe is used. Each of the output circuits includes jumpers or other suitable means for selecting either high-level or low-level fail-safe operation, such that the output material level indication automatically assumes a state to indicate a preselected material level (high or low) in the event of failure of the system and independently of actual material level at the probes.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
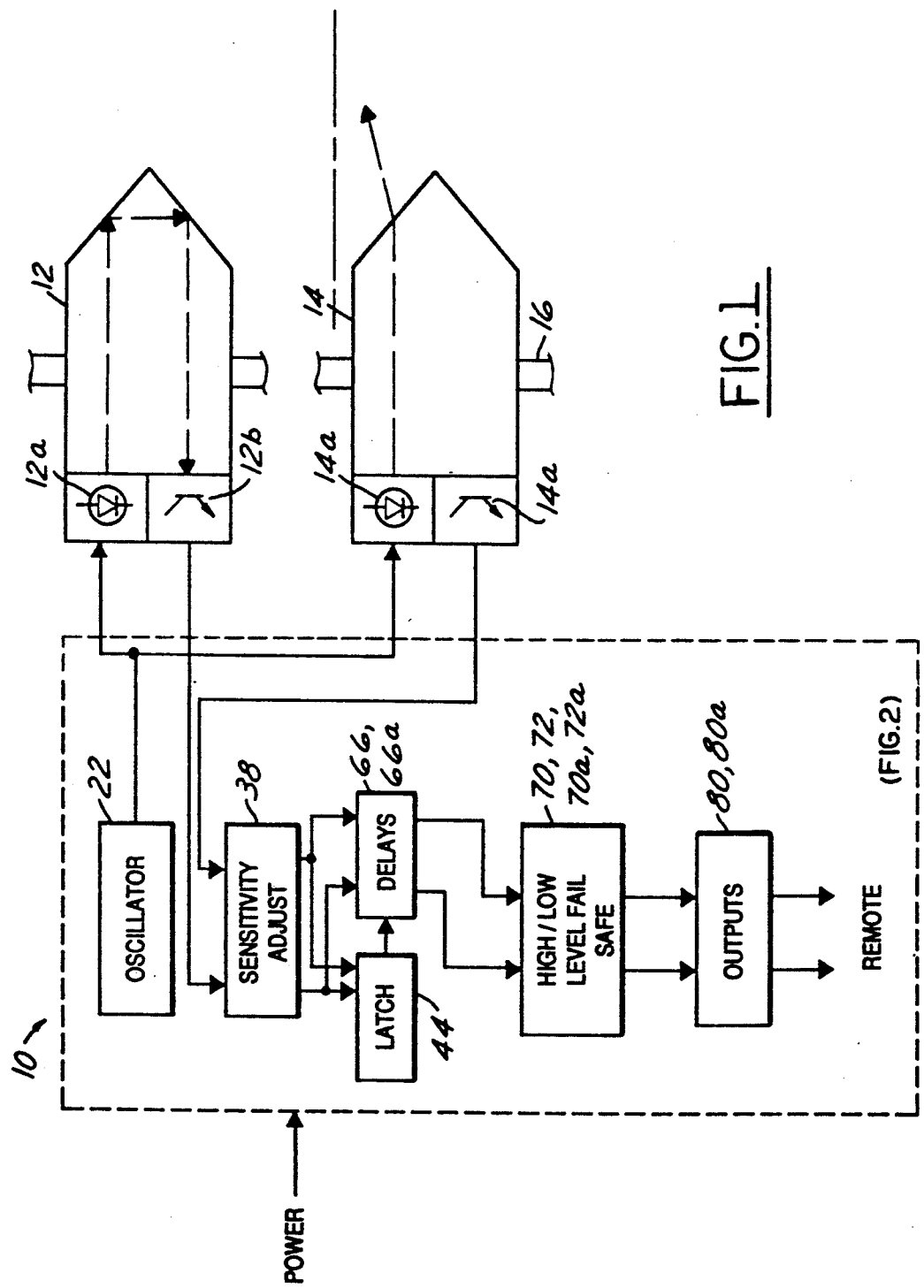
FIG. 1 is a functional block diagram of a presently preferred embodiment of the invention.

FIG. 1 illustrates a system 10 for indicating level of material in accordance with a presently preferred embodiment of the invention as comprising a pair of optical probes 12, 14 mounted on the sidewall 16 of a material container or vessel so that material within the vessel covers the inner end of each probe when material within the vessel is at the level of the probe. (Although the invention is described in conjunction with disposition of both probes 12, 14 within a single vessel it is also envisioned in some applications that it may be desirable to position the probes within respective differing vessels.) An LED 12a, 14a is positioned externally of each associated probe 12, 14 for directing light energy lengthwise through the probe to the inner probe end within the vessel. Likewise, a phototransistor or other suitable optical detector 12b, 14b is positioned externally adjacent to each associated probe 12, 14 for receiving light energy from the associated LED internally reflected within the probe body when the probe end is uncovered. On the other hand, when the end of the associated probe is covered by material, as shown in connection with probe 14 in FIG. 1, the optical energy from the associated LED exits the probe end into the material, so that the associated phototransistor 14b is dark.

Figure 2:
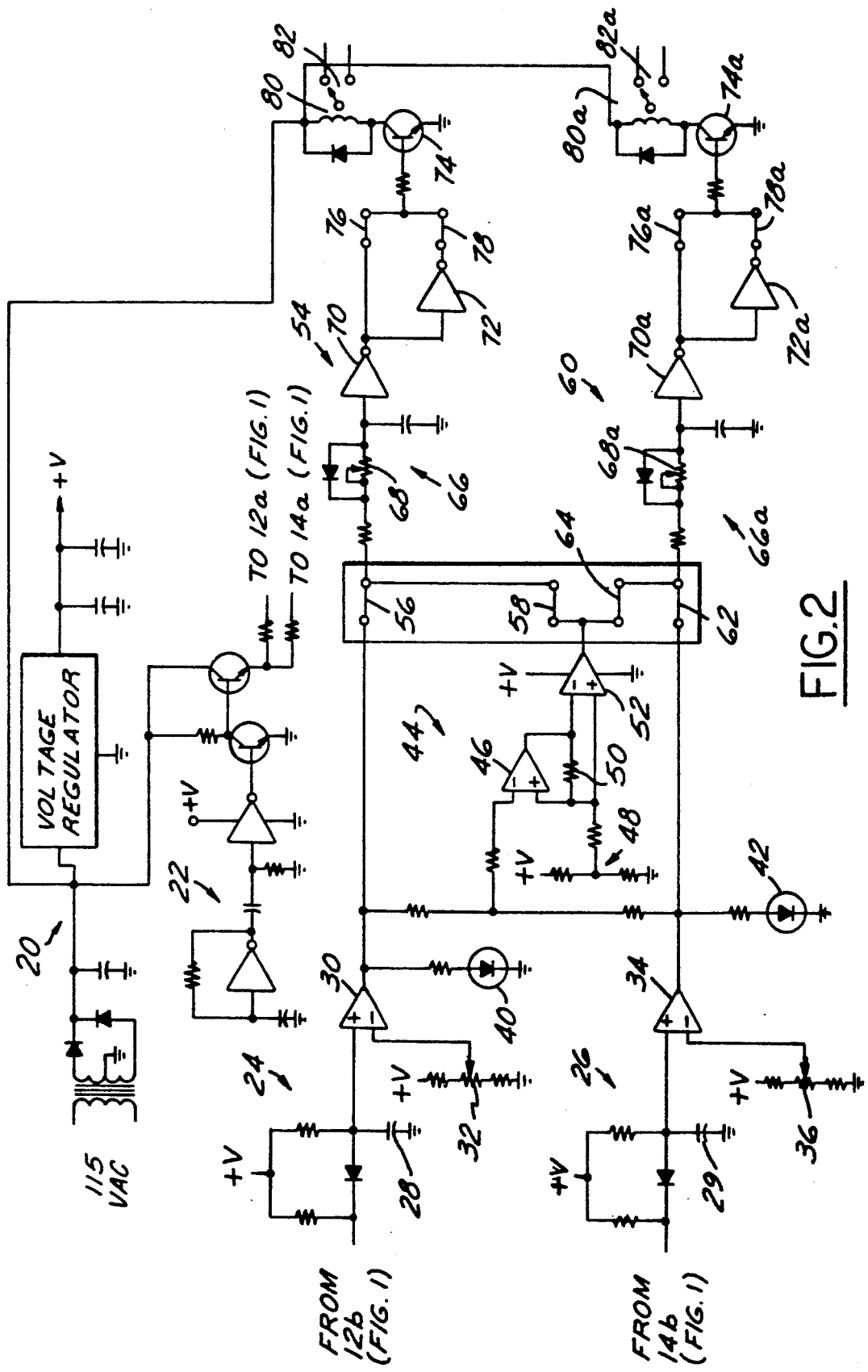
FIG. 2 is an electrical schematic diagram of the system illustrated in functional block form in FIG. 1.

Referring to both FIGS. 1 and 2, a power supply 20 is connected to an external source of utility power or the like for supplying electrical power to the remaining components of system 12. An oscillator 22 provides a pulsed signal to LED's 12a, 14a (FIG. 1) at substantially constant frequency and duty cycle. Phototransistors 12b, 14b are connected to respective input circuits 24, 26 (FIG. 2) in which each pulsed phototransistor signal (if present) is fed to an associated capacitor 28, 29 for converting the pulsed signal into a constant dc level. Capacitor 28 within circuit 24 is connected to the non-inverting input of a comparator 30, which has its inverting input connected to an adjustable resistor 32 for selectively varying the reference threshold of comparator 30. Likewise, capacitor 29 of input circuit 26 is connected to the non-inverting input of a comparator 34, which has its inverting reference input connected to a variable resistor 36 for selectively adjusting the reference threshold at comparator 34.

The combinations of comparator 30 and resistor 32, and comparator 34 and resistor 36, provide for sensitivity adjustment 38 (FIG. 1) of the respective input circuits. When the probe tip is uncovered by material, the pulsed signal at each LED 12a, 14a is returned to the associated photoresistor 12b, 14b, and the voltage across the associated capacitor 28, 29 at same positive dc potential. Resistors 32, 36 are adjusted to provide a high voltage or state at the output of comparator 30, and a high voltage or state at the output of comparator 34. Thereafter, when material covers the probe tips, the outputs of comparators 30, 34 switch low. In the specific situation illustrated in FIG. 1, where probe 12 is uncovered and probe 14 is covered, the output of comparators 30 would be high and the output of comparator 34 would be low.

The output of comparator 30 is connected across an LED 40, which is illuminated whenever the voltage at capacitor 28 of input circuit 24 is greater than the threshold set by resistor 32, indicating loss of light pulses at phototransistor 12b and presence of material at the associated probe 12. Similarly, the output of comparator 34 is connected across an LED 42, which is illuminated by comparator 34 whenever the voltage across capacitor 29 of input circuit 26 is greater than the threshold set by resistor 36, indicating loss of light pulses at phototransistor 14b and therefore presence of material at the end of associated probe 14. A latch circuit 44 has an input connected to the outputs of circuits 24, 26 at the outputs of their respective comparators. Latch 44 includes a comparator 46 configured at a Schmitt trigger, with an inverting input connected to the outputs of comparators 30, 34 and a non-inverting input connected to a voltage divider 48. The output of comparator 46 is connected to the noninverting input through a resistor 50, and to the inverting input of a comparator 52. The non-inverting input of comparator 52 is connected to voltage divider 48. Thus, the output of comparator 52 assumes a high voltage level or state when the inputs to comparator 46 from both comparators 30, 34 are at a high voltage level or state, and switches to a low voltage level or state when both of the inputs to comparator 46 are at a low voltage level or state. Thus, the output of latch 44 switches state only when both inputs from the circuits 24, 26 switch state.

An output circuit 54 has an input that is selectively connectable by a jumper 56 directly to the output of input circuit 24, or connectable by the jumper 58 to the output of latch 44. Likewise, an output circuit 60 has an input selectively connectable by a jumper 62 to the output of input circuit 26, or connectable by the jumper 64 to the output of latch 44. Output circuit 54 includes a delay 66 with a variable resistor 68 for selective operator adjustment of delay 66 so that the circuit output is relatively immune to transient conditions. Delay 66 is connected through an inverter 70 to a second inverter 72. An output transistor 74 has a base that is selectively connectable to the outputs of inverters 70, 72 through the respective jumpers 76, 78. The collector of transistor 74 is connected to the coil of a relay 80, which has switch contacts 82 for providing outputs to remote indicating and/or control circuitry. Output circuit 60 includes an identical delay 66a, inverters 70a 72a, jumpers 76a, 78a, transistor 74a and relay 80a with switch contacts 82a. Jumpers 76, 76a, 78, 78a provide for high or low fail-safe indication. That is, when jumper 76 is in place and jumper 78 is removed, for example, relay 80 and relay contacts 82 are normally energized, and are de-energized when material covers the probe. Thus, if power is lost and relay 80 is de-energized because of such power failure, for example, a high material level is indicated by relay contacts 82 independently of actual material level. In the same way, jumper 78 (and jumper 78a) provide for low level fail-safe operation, in which the associated relays are normally de-energized and energized only when material covers the probe, whereby relay de-energization in the event of power failure automatically indicates a low material level independently of actual material level at the probe.

Jumpers 56, 58, 62, 64, 76, 78, 76a and 78a are illustrated in FIG. 2 as being in place, which is the condition in which the system of the present invention preferably is provided by the manufacturing plant to the job site, and the set-up operator or technician selectively removes jumpers as desired to program the system for the desired mode of operation. For example, with both jumpers 56, 62 left in place and jumpers 58, 64 removed, output circuits 54, 60 will function in a first mode of operation to follow the associated input circuit 24, 26. For example, if high level fail-safe is selected at output circuit 54 by leaving jumper 76 in place and removing jumper 78, relay 80 is normally energized and will be de-energized when the output of input circuit 24 switches high, indicating that material at probe 12 (FIG. 1) covers the probe tip. On the other hand, if the installation operator or technician leaves jumpers 56 and 64 in place, while removing jumpers 58 and 62, output circuit 54 will follow input circuit 24 as previously described, while output circuit 60 follows latch 44 so as to change state at relay 80a only when both input circuits 24, 26 change state. In a third mode of operation, the installation operator or technician may delete both jumpers 56 and 62, while leaving jumpers 58 and 64 in place, so that both output circuits 54, 60 follow latch 44.

It will be apparent from the foregoing discussion that only one of the jumpers of each jumper pair 56, 58, pair 62, 64 pair 76, 78 and pair 76a, 78a may be left in place for the circuit to operate properly in either of the first, second or third modes of operation (selected by jumpers 56–64), or in high level or low level fail-safe operation (selected by jumpers 76, 76a, 78 and 78a). As a modification, jumper pair 56, 58, jumper pair 62, 64, jumper pair 76, 78 and/or jumper 76a, 78a may be replaced by suitable single pole double throw switches that may be selectively set by the operator at installation. Such modification would be advantageous where it is anticipated that reprogramming of the system may be desirable during normal system service life.

It will also be apparent from the foregoing discussion that, although the system of the present invention has been disclosed in conjunction with an optical probe arrangement of the type disclosed in U.S. Pat. No. 3,834,235, any one of the other point-level systems hereinabove described may be readily accommodated with only minor variation in the input circuitry for accepting the type of signals provided by each indicator.

I claim:

1. A system for indicating level of material that comprises:

first and second probe means disposed for operative coupling with material whose level is to be sensed, first and second electrical input means respectively coupled to said first and second probe means, and providing respective first and second signals at a first voltage state when material is adjacent to the respective probe means and at a second voltage state when material is spaced from the respective probe means, first and second electrical output means for indicating level of material, and means for selectively connecting said first and second input means to said first and second output means so as to operate said output means in a first mode of operation in which said first output means is responsive to said first input means and said second input means is responsive to said second input means each independently of the other, and a second mode of operation is which one of said output means is responsive to one of said input means independently of the other and the other of said output means is responsive to both of said input means conjointly.

2. The system set forth in claim 1 wherein said means for selectively connecting said first and second input means to said first and second output means includes means for connecting said input means to said output means is said second mode of operation such that said second output means changes state only when both of said first and second signals change state.

3. The system set forth in claim 1 wherein said means for selectively connecting said first and second input means to said first and second output means includes means in a third mode of operation, distinct from said first and second modes for operating both of said output means when both of said first and second signals change state.

4. The system set forth in claim 1 wherein said means for selectively connecting said input means to said output means comprises latch circuit means having first and second inputs respectively connected to receive said first and second signals and a latch output that assumes a first state when said first and second signals have a first relationship and a second state when said first and second signals have the opposite relationship, and means for selectively and alternatively connecting each said output means either to said latch output or to the associated said input means.

5. The system set forth in claim 1 wherein each of said input means includes means for receiving an electrical input signal from the associated probe means, means for comparing said input signal to a threshold, and means for providing the associated said probe signal as a function of such comparison.

6. The system set forth in claim 5 wherein said means for comparing said input signal to a threshold includes means for selectively adjusting said threshold.

7. The system set forth in claim 1 wherein each of said first and second output means includes fail-safe means for operating said output means to indicate a preselected material level in the event of failure of said system independently of actual material level at said probe means.

8. The system set forth in claim 1 wherein said first and second probe means each comprise a light probe having an end disposed for contact with material whose level is to be sensed, means for transmitting light energy through said probe to said end and means for receiving light energy reflected internally of said probe at said end.

9. A system for indicating level of material that comprises:

first and second probe means disposed for operative coupling with material whose level is to be sensed, first and second electrical input means respectively coupled to aid first and second probe means, each of said input means having an output for providing an associated signal at a first state when material is adjacent to the associated said probe means and a second state when material is spaced from the associated said probe means.

first and second electrical output means each having an input and an output for indicating level of material, latch circuit means having first and second inputs respectively coupled to said outputs of said first and second input means and a latch output that assumes a first state when both of said probe signals are at one of said first and second states, and a second state when both of said probe signals are at the other of said first and second states, and means for selectively and alternatively connecting each said input of said first and second output means either to said latch output or to the said output of the associated first and second input means.

* * * * *